United States Patent [19]

Willach

[11] Patent Number: 4,909,187
[45] Date of Patent: Mar. 20, 1990

[54] PULSATOR FOR MILKING MACHINES

[75] Inventor: Eberhard Willach, Straubing, Fed. Rep. of Germany

[73] Assignee: Westfalia Separator AG, Oelde, Fed. Rep. of Germany

[21] Appl. No.: 148,793

[22] Filed: Jan. 27, 1988

[30] Foreign Application Priority Data

Jan. 28, 1987 [DE] Fed. Rep. of Germany ....... 3702419

[51] Int. Cl.<sup>4</sup> .............................................. A01J 5/12
[52] U.S. Cl. .................................. 119/14.41; 137/103
[58] Field of Search ............... 119/14.37, 14.38, 14.39, 119/14.40, 14.41, 14.27, 14.28, 14.29, 14.30, 14.01; 137/624.15, 103

[56] References Cited

U.S. PATENT DOCUMENTS

| 2,086,678 | 7/1937 | Plint | 119/14.41 |
| 3,347,252 | 10/1967 | Hanson | 137/82 |
| 3,451,414 | 6/1969 | Buford | 137/82 |
| 4,538,634 | 9/1985 | Seaborne | 137/103 |

FOREIGN PATENT DOCUMENTS

| 131383 | 9/1949 | Australia | 119/14.41 |
| 492940 | 5/1953 | Canada | 137/103 |
| 2931265 | 2/1981 | Fed. Rep. of Germany | 119/14.41 |
| 3500296 | 7/1986 | Fed. Rep. of Germany | 119/14.39 |
| 998214 | of 1951 | France | 119/14.29 |
| 1327851 | 8/1987 | U.S.S.R. | 119/14.37 |
| 1401135 | 7/1975 | United Kingdom | 119/14.29 |

Primary Examiner—Robert P. Swiatek
Assistant Examiner—Nicholas D. Lucchesi
Attorney, Agent, or Firm—Sprung Horn Kramer & Woods

[57] ABSTRACT

The operating chambers in a pulsator have axially movable partitions that make it possible to vary their capacities. The primary effect of varying the capacities is to vary the rate of the pulsator in a very simple way. It is also possible, however, to eliminate any wobble that may occur by varying the capacities of the chambers individually.

3 Claims, 2 Drawing Sheets

PULSATOR FOR MILKING MACHINES

BACKGROUND OF THE INVENTION

The invention concerns a pulsator for milking machines, consisting of a housing that positions a control spindle, of a mechanism that is activated by the control spindle and that alternately connects the pulsator outlets to a source of vacuum and to the atmosphere, of operating chambers, one positioned at each end of the control spindle, that move it back and forth, and of a diversion mechanism that alternately connects each operating chamber to the source of vacuum and to the atmosphere.

A pulsator of this type, which operates in a push-pull mode, is known from German OS 2 931 265. It is employed to alternately connect the spaces between two pairs of teat cups in a milking system to a source of vacuum and to the atmosphere. The time during which the space between the teat cups is connected to the source of vacuum is called the suction phase. Its length can be varied by varying the rate of the pulsator.

The known pulsator has an adjustable choke for varying its rate. The choke is positioned in a line that connects two attenuating chambers in the pulsator. Unavoidable manufacturing tolerances can, however, make the control spindle move at a different speed in each direction. The result is a difference in the durations of the vacuum and atmospheric pressure controlled by the two operating chambers, which can be alternately transmitted to the spaces between the two pairs of teat cups. This irregularity on the part of the known pulsators is called wobble. Furthermore, there is a drawback to adjustable chokes in that they clog up very easily because the cross-section that is to be adjusted is, due to the low capacities of the operating chambers, very small.

SUMMARY OF THE INVENTION

The object of the present invention is to provide a pulsator that has an easy-to-adjust rate and that can also be operated without wobble.

This object is attained by the improvement wherein at least one of the operating chambers accommodates means for varying its capacity.

The capacity of the operating chambers has a direct effect on the time it takes to establish and release the pressure therein. When the capacity is small, the pressure can be established and released more rapidly than when the capacity is larger. Thus, reducing the capacity of the operating chambers makes it possible to accelerate the motion of the control spindle, increasing the rate of the pulsator and abbreviating the duration of the suction phase. If the capacity of only one operating chamber is reduced, the suction phase will be abbreviated only in that half of the pulsator.

The means of varying the capacity of the operating chambers can be axially movable partitions accommodated therein. The partitions separate the available operating space into an active space that is alternately subjected to vacuum and to atmospheric pressure and an inactive space that is independent of the process.

The partitions in one practical embodiment of the invention are connected to controls that are accessible from outside the housing. This measure particularly facilitates adjusting the rate and eliminating wobble.

The controls can for example be threaded bolts secured to the partitions and extending out of the housing through threaded bores.

The means for varying the capacity of the operating chambers in one preferred embodiment of the invention can be plugs that can be inserted loosely therein. The plugs must be large enough to reduce the capacity of the operating chamber in accordance with the level of wobble.

If the level of wobble and the rate of the pulsator are to be varied simultaneously, plugs of various sizes, depending on the level of wobble, can be employed.

The plugs in one preferred embodiment consist of annular segments. The rate and wobble level of the pulsator can accordingly easily be adjusted be inserting different numbers of segments in the operating chambers. In this embodiment it is particularly practical to dimension the segments and the plugs as a whole such that leaving out one segment for example will decrease the rate by exactly one unit. This measure will make it possible for even less skilled milking-machine users to adjust the rate to a prescribed level.

The invention will now be described with reference to the drawing, wherein

DESCRIPTION OF THE PREFERRED EMBODIMENTS

Figure 1:
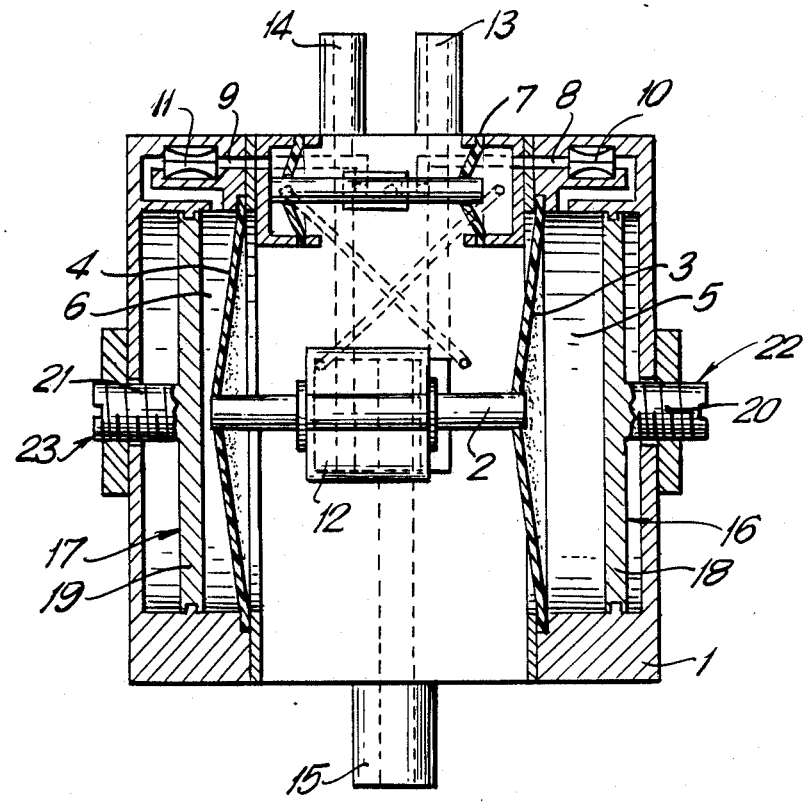
FIG. 1 is a schematic cross-section through a pulsator with movable partitions in the operating chambers.

The pulsator housing 1 illustrated in FIG. 1 accommodates a control spindle 2 that has diaphragms 3 and 4 at each end, demarcating operating chambers 5 and 6. A diversion mechanism 7, the function of which is generally known, alternately connects each operating chamber 5 and 6 to atmospheric pressure and to a vacuum through channels 8 and 9 and chokes 10 and 11. A control slide 12 on spindle 2 alternately connects each connection 13 and 14, which lead to spaces between the teat cups, to a source 15 of vacuum and to the atmosphere as control spindle 2 moves back and forth. Operating chambers 5 and 6 accommodate means 16 and 17 for reducing their capacity. These means consist of axially movable partitions 18 and 19. Their position can be shifted from outside by means of controls 20 and 21 in the form of threaded bolts 22 and 23.

Control spindle 2 moves back and forth in a known way subject to the varying pressure in operating chambers 5 and 6. The rate at which they move is initially dictated by the particular selected capacities of operating chambers 5 and 6 and cross-sections of chokes 10 and 11. If the rate is not desired rate, it can easily be adjusted by axially moving partitions 18 and 19 by means of threaded bolts 22 and 23. The resulting reduction in the capacities of operating chambers 5 and 6 increases the rate and vice versa. Once the desired rate has been attained in this way, any wobble can be eliminated by adjusting the capacity of just one of the operating chambers 5 and 6.

Figure 2:
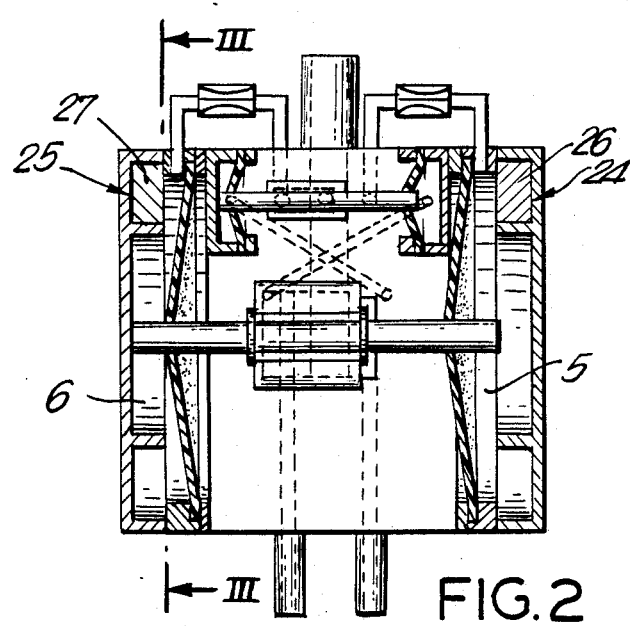
FIG. 2 is a cross-section through a pulsator with plugs in the operating chambers.

The capacities of the operating chambers 5 and 6 in the embodiment illustrated in FIG. 2 are adjusted by inserting or removing plugs 24 and 25, each of which consists of a number of segments 26 and 27. Segments 26 and 27 can be dimensioned such that adding or removing one will vary the rate by one unit. The rate can accordingly be varied as desired.

Figure 3:
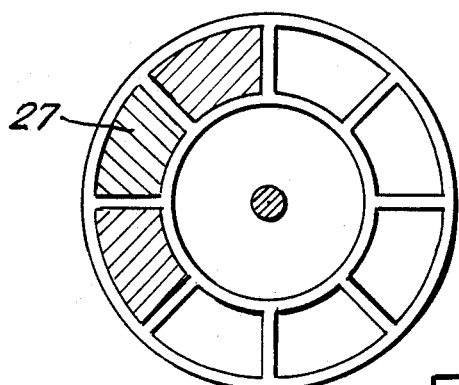
FIG. 3 is a section along the line III—III in FIG. 2.

FIG. 3 illustrates the shape of the segments 26 and 27 of the plugs 24 and 25.

Figure 4:
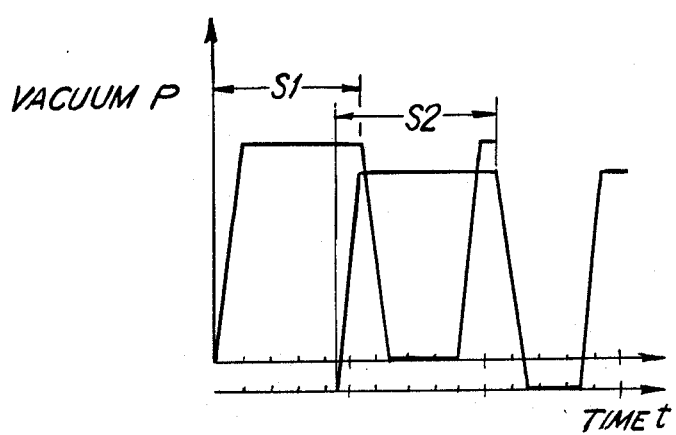
FIG. 4 is a graph illustrating how the pressures are established and released in the teat cups over time.

FIG. 4 illustrates the activity of the pressure generated in the spaces between the teat cups. The suction phase S1 in one pair of teat cups is obviously shorter than the suction phase S2 in the other pair, resulting in wobble. The level of this wobble can now be easily decreased by moving one partition 18 or 19 or by inserting or removing segments 26 and 27. If the wobble is to be eliminated without affecting the rate of the pulsator, the capacity of the operating chamber that governs suction phase S1 must be expanded and that of the chamber that governs suction phase S2 reduced. If it is only the rate of the pulsator that is to be adjusted, the capacities of both chambers must be expanded or reduced by the same amount.

What is claimed is:

1. In a pulsator for milking machines, comprising a housing having outlets, a control spindle mounted in the housing for axial movement, means activated by the control spindle for alternatingly connecting the housing outlets to a source of vacuum and to atmospheric pressure, means forming operating chambers positioned at each end of the control spindle for axially moving the spindle and a diversion mechanism for alternatingly connecting each operating chamber to the source of vacuum and to atmospheric pressure, and wherein at least one of the operating chambers accommodates means for varying the capacity of said at least one of the operating chambers, and wherein the means for varying the capacity of said at least one of the operating chambers comprises an axially movable partition separate from the means forming operating chambers, in said at least one of the operating chambers.

2. The pulsator as in claim 1, further comprising control means connected to the partitions and accessible from outside the housing.

3. The pulsator as in claim 2, wherein the control means comprises a threaded bolt secured to the partition and extending out of the housing through a threaded bore.

* * * * *